3,770,869
Patented Nov. 6, 1973

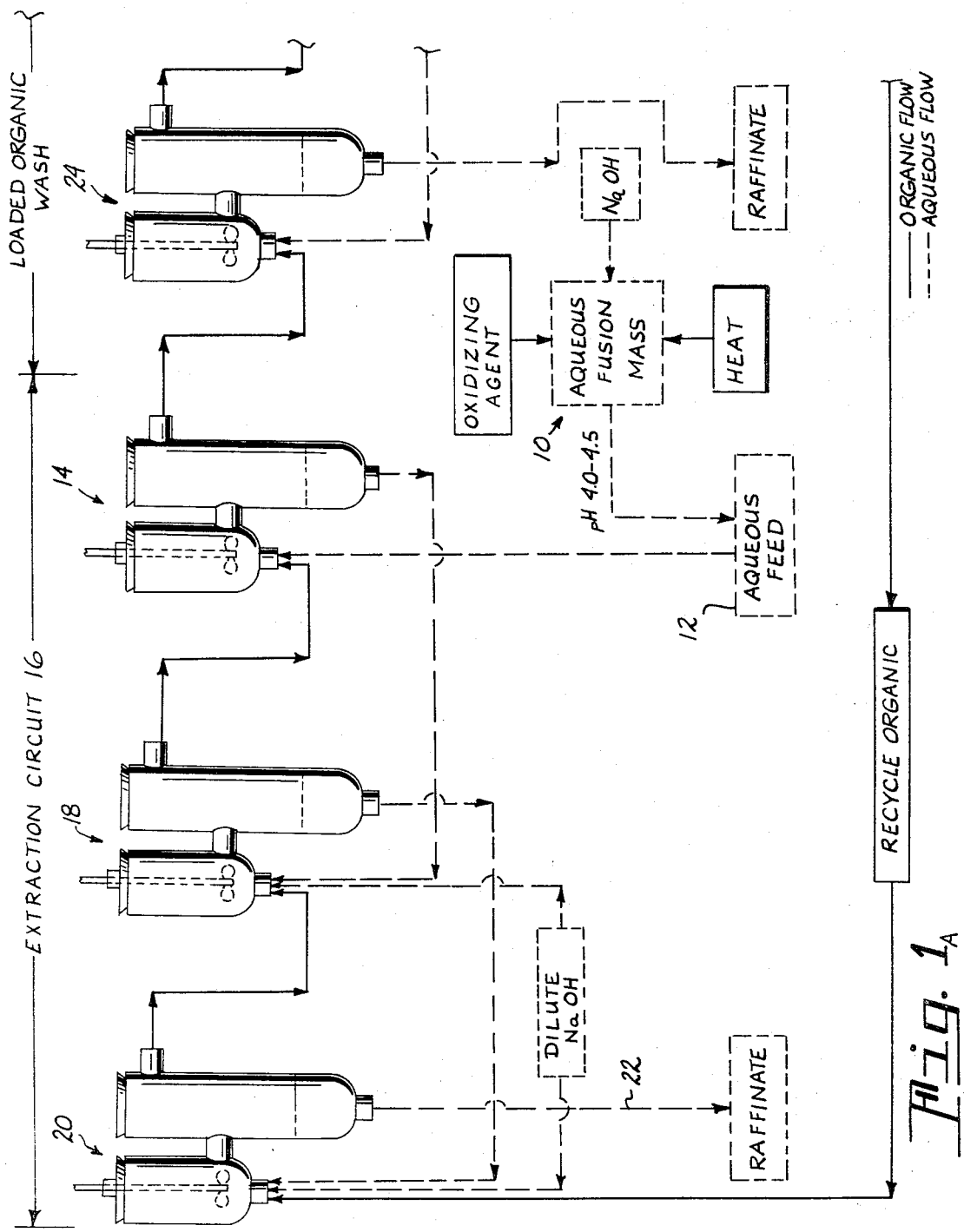

3,770,869
RECOVERY OF MOLYBDENUM
Tai K. Kim, L. Rita Pagnozzi, Martin B. MacInnis, and John M. Laferty, Towanda, Pa., assignors to GTE Sylvania Incorporated
Filed May 19, 1972, Ser. No. 255,010
Int. Cl. C01g 39/00
U.S. Cl. 423—54                 5 Claims

ABSTRACT OF THE DISCLOSURE

A process for the recovery of molybdenum values from aqueous solutions derived from the alkali fusion of molybdenum bearing ores is disclosed. The process involves treatment of the aqueous solution with an excess of an oxidizing agent to achieve a solution essentially free of sulfide ions under controlled basic pH conditions, heating to a sufficient temperature to attain a solution substantially free of excess oxidizing agent, adjusting the pH to about 4.0 to about 4.5 and contacting in a plurality of stages with a tertiary amine extractant solution, and adjusting the pH intermediate of the stages and thereafter recovering the molybdenum from the extractant solution and recycling the extractant solution.

CROSS REFERENCES TO RELATED APPLICATIONS

Copending application Ser. No. 255,011, now U.S. Pat. 3,725,524, and Ser. No. 255,012, filed concurrently herewith and assigned to the same assignee as this invention relate to the alkali fusion of molybdenum bearing ores wherein an alkali metal carbonate is used. The fusion mass derived from these processes can be further processed in accordance with this invention to recover the molybdenum values therefrom.

Copending applications, Ser. No. 255,233, Ser. No. 255,234 and Ser. No. 255,232, filed concurrently herewith and assigned to the same assignee as the present invention discloses improvements in the recovery of rhenium from molybdenum solutions. These processes can be used in conjunction with the process of this invention.

BACKGROUND OF THE INVENTION

Field of the invention

This invention relates broadly to the recovery and the purification of molybdenum from normal alkali molybdate aqueous solutions. Specifically, it relates to recovery and purification of molybdenum from normal alkali molybdate aqueous solutions.

Prior art

Ammonium paramolybdate has heretofore customarily derived by a process which starts roasting molybdenum-bearing ores to obtain technical- grade $MoO_3$. The technical-grade $MoO_3$ is then sublimed to yield "pure" $MoO_3$ which contains about 1% impurities. The $MoO_3$ is digested in hot $NH_4OH$ either at atmospheric or elevated pressure and ammonium paramolybdate (>99.5% purity) is recovered by recrystallization. The ammonium paramolybdate can be converted to pure oxide which meets the purity requirements for pressing and sintering, electrodes, sheet and plate, wire products, etc. Recently, V. Kunda (U.S. Pat. 3,196,004), S. R. Zimmerly et al. (U.S. Pat. 3,314,783), and M. E. Messner et al. (U.S. Pat. 3,376,104) describe processes for obtaining pure molybdenum products from molybdenite ore concentrates. The processes generally involve roasting, leaching, filtering, oxidizing, drying, and/or precipitating steps to obtain the final ammonium paramolybdate product.

More recently, V. Chiola et al. (U.S. Pats. 3,576,595 and 3,598,519) described improved processes for the recovery of molybdenum values. One of the processes (U.S. Pat. 3,576,595) involves the NaOH digestion of an impure molybdenum source to form $Na_2MoO_4$. The resulting $Na_2MoO_4$ solution is treated to remove silica and the pH of the solution is adjusted to pH by the addition of $H_2SO_4$ and maintained at that value by the further addition of $H_2SO_4$. The molybdenum is then extracted from the aqueous solution by a three-component organic system (tertiary alkyl amine, tributyl phosphate (TBP) and kerosene). The loaded organic solution is then stripped and ammonium paramolybdate recovered by crystallization. The product is shown to be of high purity with respect to cations. The other process (U.S. Pat. 3,598,519) involves the sulfuric acid digestion of an impure molybdenum source. The resulting molybdenum solution is maintained below a pH of about 0.5 to insure the formation of extractable molybdenum sulfate complexes anions. The molybdenum is then extracted from the aqueous solution by a two-component organic system composed of a tertiary alkyl amine (Alamine-336) and a water insoluble aromatic hydrocarbon solvent for the amine such as S.C. No. 28 as supplied by Buffalo Solvents and Chemical Corporation. The loaded organic is then stripped and the molybdenum is recovered as ammonium molybdate substantially free of cationic impurities.

The disadvantages of molybdenum processes prior to U.S. Pats. 3,576,595 and 3,598,519 are detailed in U.S. Pat. 3,598,519.

The disadvantage of the three-component extraction process (U.S. Pat. 3,576,595) is that a solubilizer is required (TBP) which means that one must maintain stringent control of temperature and pH. Another disadvantage of this process is the preferred operating pH is about 2. At a pH of 2, both cationic and anionic molybdenum species exist. The tertiary alkyl amine salt extractant will extract both species. The cationic species is extracted as the sulfate salt which means that on stripping the product will be contaminated with sulfate anions. A disadvantage of the two-component system as disclosed in U.S. Pat. 3,598,519 is that the molybdenum is extracted from an aqueous solution which has a pH of less than than 0.5. Since the molybdenum is extracted as molybdenum sulfate complexes and ions, the molybdenum product resulting from stripping the pregnant organic contains high sulfate concentrations.

It is believed, therefore, that a process that enables the recovery of molybdenum values substantially free of anionic impurities is an advancement in the art.

OBJECTS AND SUMMARY OF THE INVENTION

It is an object of this invention to provide a process that recovers molybdenum values from fusion mass derived from alkali fusion of molybdenum ores.

It is a further object of this invention to provide an extraction process that recovers molybdenum values relatively free of anionic impurities.

It is another object of this invention to provide a process which enables the efficient recovery of molybdenum by trialkylamines that requires less acid than prior art processes.

These and other objects of this invention are achieved in one aspect of this invention by a process that comprises adding a sufficient excess of an oxidizing agent to the aqueous solution of fusion mass to insure attaining a solution that is essentially free of sulfide ion while the solution is at a pH greater than 7, heating the resulting solution to produce a solution substantially free of any excess oxidizing agent, maintaining the pH of the solution at about 9.0 to precipitate any silica present, removing the precipitate silica, adjusting the pH of the solution to about 4.0 to about 4.5, extracting the molybdenum values by contacting the resulting solution with an extractant solution comprising a tertiary amine dissolved in an aromatic organic solvent in a plurality of stages, adjusting the pH of the aqueous solution to about 4.0 to about 4.5 intermediate of each of the stages by the addition of an alkali metal hydroxide and recovering said molybdenum values from the organic extractant solution and recycling the organic extractant.

BRIEF DESCRIPTION OF THE DRAWING

The drawing is a flow sheet of a typical process utilizing the subject invention.

DETAILED DESCRIPTION OF THE PREFERRED EMBODIMENT

Figure 1B:
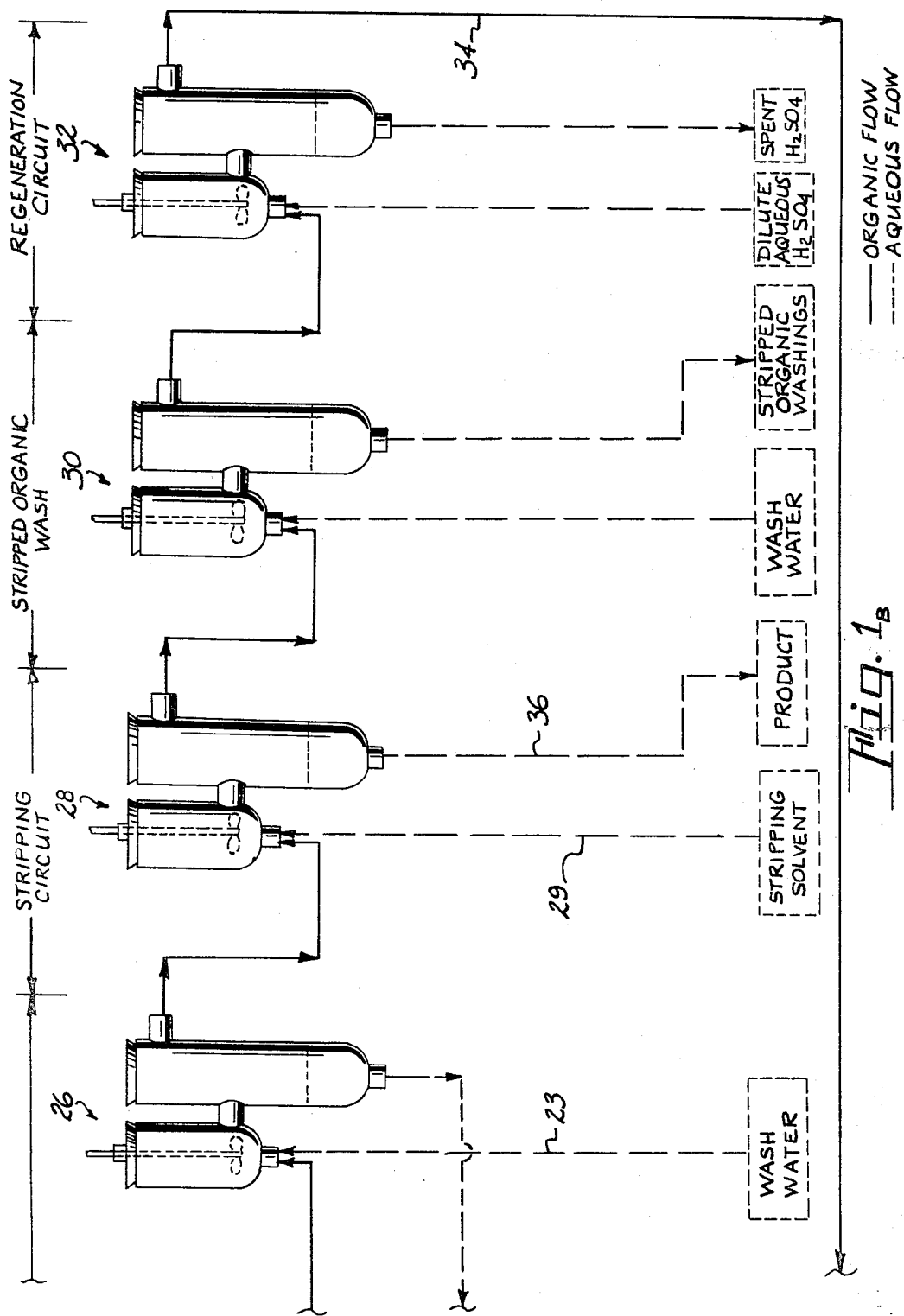

For a better understanding of the present invention, together with other and further objects, advantages, and capabilities thereof, reference is made to the following disclosure and appended claims in connection with the above description of some of the aspects of the invention.

This invention is a process consisting essentially of treating a normal alkali molybdate aqueous solution, preferably from an alkali carbonate fusion of molybdenite as disclosed in copending patent applications Ser. No. 255,011, now U.S. Pat. 3,725,524 and Ser. No. 255,012, with an excess oxidizing agent on the basic side to attain a solution which is essentially free of sulfide ions, that is, one which typically has the sulfide ion concentration less than $10^{-7}$ moles/liter. An excess of the amount theoretically required to convert sulfide to sulfate is used. The solution is then heated to eliminate the excess oxidizing agent, a pH of about 9.0 is maintained by adjustments with a mineral acid such as sulfuric acid, if required, until the silica present precipitates, thereafter the precipitate is removed, and the pH of the solution is adjusted to a pH of about 4.0 to 4.5 with a mineral acid such as sulfuric acid. The foregoing silica removal step is the conventional method for removing silica from molybdenum solutions containing silica. The resulting solution is used as the feed solution in a solvent extraction process wherein it is contacted with a mixture of a tertiary amine in a hydrocarbon diluent using a multiple stage extraction circuit. The pH of the aqueous phase before each extraction stage is adjusted to a pH of about 4.0 to 4.5 by the addition of an alkali metal hydroxide preferably 8-N sodium hydroxide. The raffinate generally contains less than about 0.5 g. $MoO_3$/liter. The molybdenum-loaded organic solution is washed with deionized water and contacted in a one-stage stripping unit with ammonium hydroxide adjusted to a pH of about 9 to 14. The aqueous solution is collected as high-purity ammonium molybdate solution, generally having a concentration of at least about 175 grams/liter. The barren organic is washed with deionized water and then contacted with about 1.5 $NH_2SO_4$ solution. The regenerated organic is then recycled to the extraction circuit. A typical flow sheet of the process is shown in the drawing.

Examples of suitable trialkylamines include tricaprylylmethyl-amine, tri-isoctylamine, and tri-isodecylamine and the like. Thus, trialkylamines that contain alkyl groups having from 8 to about 10 carbon atoms are particularly useful. Suitable commercial trialkyl amines such as Alamine-336, sold by General Mills, or Adogen 364, sold by Archer-Daniels-Midland, Inc. can be used. The hydrocarbon can be a water-insoluble hydrocarbon having predominantly high aromatic content such as S.C. No. 28 as supplied under that trade name by Buffalo Solvents and Chemical Corporation. S.C. 28 is a mixture of organic solvents containing about 97% by volume of hydrocarbons having an average of 8 carbon atoms and aromatics, less than 0.9% by volume of olefins, about 21.6% by volume of F.I.A. saturates, a boiling point range of from 318° to 386° F. and a flash point of 105° F. The specific gravity of S.C. 28 is 0.851 at 60°/60° F. High flash naptha, benzene, and toluene can also be used. By water-insoluble, it is meant that less than about 5 grams of the hydrocarbon will dissolve in 100 cm.³ of water at 25° C.

With particular reference to the drawing, an aqueous fusion mass 10 is treated with an excess amount of an oxidizing agent while at a pH of greater than 7 and thereafter heated to eliminate any excess oxidizing agent and is adjusted in pH to 4.0 to 4.5 by the addition of sulfuric acid after the silica removal step. An aqueous feed solution 12 is thereby produced which is fed to the first stage 14 of extraction circuit 16 at the rate of 320 ml./min. The multiple stage extraction circuit 14 as illustrated consists of the extraction units 14, 18 and 20. The organic extractant consisting essentially of 15% by volume of a tricaprylyl methylamine sold under the trade name Alamine 336 by General Mills dissolved in a highly aromatic content solvent S.C. #28 enters extraction stage 20 at the rate of about 500 ml./min., thus countercurrent flow is established. The aqueous feed is maintained at a pH of from 4.0 to 4.5 by the addition of a sodium hydroxide solution as it enters extraction stages 18 and 20. The aqueous raffinate 22 containing less than 0.5 g. $MoO_3$/liter exits from stage 20 while the loaded organic exits from stage 14. The organic is washed with deionized water 23 at the rate of about 500 ml./min. in two stages 24 and 26 and enters stripping stage 28. A stripping solvent such as ammonium hydroxide 29 at the rate of about 200 ml./min. is fed to unit 28 to remove the molybdenum as ammonium bolybdate which is later converted to ammonium paramolybdate by crystallization. The stripped organic is then washed in unit 30 and regenerated by dilute $H_2SO_4$ in unit 32. The regenerated organic 34 exiting from unit 32 is recycled to extraction stage 20 in a continuous process. The product stream 36 exiting from stripping stage 28 contains essentially no anion impurities and has a molybdenum concentration of 175 g. $MoO_3$/liter.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for the recovery of molybdenum from the aqueous solution derived from the fusion mass produced in the alkali fusion of molybdenum ores comprising
   (a) adding a sufficient excess of an oxidizing agent to insure attaining a solution that is essentially free of sulfide ions while said solution is at a pH of greater than 7,
   (b) heating the resulting solution to a sufficient temperature to attain a solution that is substantially free of excess oxidizing agent,
   (c) maintaining the pH of said solution at about 9.0 for a sufficient time to precipitate any silica,
   (d) removing said silica from said solution,
   (e) adjusting the pH of said solution to about 4.0 to about 4.5 with a mineral acid,
   (f) extracting the molybdenum values from the resulting aqueous solution by contacting with an organic extractant solution comprising a tertiary amine dissolved in a water insoluble highly aromatic solvent in a plurality of extraction stages,
   (g) adjusting the pH of the aqueous phase to a pH of from 4.0 to about 4.5 intermediate of each stage by the addition of an alkali metal hydroxide and
   (h) recovering said molybdenum values from the loaded organic and recycling said organic to said extraction stages.

2. A process according to claim 1 wherein said trialkyl amine has alkyl groups having from about 8 to about 10 carbon atoms.

3. A process according to claim 2 wherein said alkali metal hydroxide is sodium hydroxide.

4. A process according to claim 3 wherein said molybdenum values are recovered by stripping the loaded organic by ammonium hydroxide.

5. A process according to claim 4 wherein organic extractant after removal of molybdenum is regenerated by scrubbing with sulfuric acid.

References Cited

UNITED STATES PATENTS

| | | | |
|---|---|---|---|
| 3,357,821 | 12/1967 | Henrickson | 23—312 ME |
| 3,455,677 | 7/1969 | Litz | 75—101 BE |
| 3,576,595 | 4/1971 | Chiola et al. | 75—101 BE |
| 3,578,392 | 5/1971 | Ritsko | 423—54 |
| 3,598,519 | 8/1971 | Chiola et al. | 423—54 |

HERBERT T. CARTER, Primary Examiner

U.S. Cl. X.R.

75—101 BE; 23—312 ME; 423—55